United States Patent
Chen

(10) Patent No.: US 8,656,961 B2
(45) Date of Patent: Feb. 25, 2014

(54) COMPOSITE FLEXIBLE PIPE AND METHOD OF MANUFACTURE

(75) Inventor: Bin Chen, Houston, TX (US)

(73) Assignee: DeepFlex Inc., Houston, TX (US)

( * ) Notice: Subject to any disclaimer, the term of this patent is extended or adjusted under 35 U.S.C. 154(b) by 220 days.

(21) Appl. No.: 13/255,916

(22) PCT Filed: Mar. 18, 2010

(86) PCT No.: PCT/US2010/027803
§ 371 (c)(1), (2), (4) Date: Sep. 12, 2011

(87) PCT Pub. No.: WO2010/107995
PCT Pub. Date: Sep. 23, 2010

(65) Prior Publication Data
US 2012/0018025 A1    Jan. 26, 2012

Related U.S. Application Data

(60) Provisional application No. 61/161,353, filed on Mar. 18, 2009.

(51) Int. Cl.
*F16L 11/00* (2006.01)
*B31C 3/00* (2006.01)

(52) U.S. Cl.
USPC ............................ 138/129; 138/137; 138/140

(58) Field of Classification Search
USPC .......... 138/129, 135, 136, 140, 137; 156/190, 156/192
See application file for complete search history.

(56) References Cited

U.S. PATENT DOCUMENTS

| | | | | |
|---|---|---|---|---|
| 1,943,215 | A | * | 1/1934 | Dunlap .................... 29/895.211 |
| 4,326,561 | A | * | 4/1982 | Kutnyak ........................ 138/136 |
| 5,813,439 | A | * | 9/1998 | Herrero et al. ................ 138/134 |
| 6,065,501 | A | * | 5/2000 | Feret et al. .................... 138/134 |
| 6,077,580 | A | | 6/2000 | Vasiliev et al. |
| 6,283,161 | B1 | * | 9/2001 | Feret et al. .................... 138/134 |
| 6,491,779 | B1 | | 12/2002 | Bryant |
| 6,804,942 | B2 | | 10/2004 | Bryant |

(Continued)

FOREIGN PATENT DOCUMENTS

| | | |
|---|---|---|
| CN | 2839778 A | 11/2006 |
| JP | 04-163148 A | 6/1992 |
| KR | 1020020024145 A | 3/2002 |
| WO | 2005-090848 A2 | 9/2005 |

OTHER PUBLICATIONS

International Search Report issued in PCT/US2010/027803, mailed on Nov. 1, 2010, 3 pages.

(Continued)

*Primary Examiner* — Kevin P Shaver
*Assistant Examiner* — Patrick M Buechner
(74) *Attorney, Agent, or Firm* — Osha Liang LLP

(57) ABSTRACT

Embodiments disclosed herein relate to one or more embodiments of and methods to make a reinforced flexible pipe. The reinforced flexible pipe includes a pipe structure, a first composite tape member having a T-shaped cross section, and a second composite tape member having a T-shaped cross section, in which the first composite tape member is wrapped on the pipe structure in a first orientation and the second composite tape member is wrapped on the pipe structure in a second orientation. One or more embodiments relate to a method of forming the same.

19 Claims, 6 Drawing Sheets

(56) References Cited

U.S. PATENT DOCUMENTS

| | | | |
|---|---|---|---|
| 6,889,717 B2* | 5/2005 | Coutarel et al. | 138/135 |
| 6,981,526 B2* | 1/2006 | Glejbøl et al. | 138/129 |
| 7,132,160 B2* | 11/2006 | Fox | 428/356 |
| 7,254,933 B2 | 8/2007 | Bryant | |
| 2002/0157723 A1* | 10/2002 | Odru | 138/135 |
| 2003/0026928 A1* | 2/2003 | Bryant | 428/36.3 |
| 2003/0183293 A1 | 10/2003 | Fraser | |
| 2004/0099324 A1 | 5/2004 | Fraser et al. | |
| 2004/0154677 A1* | 8/2004 | Coutarel et al. | 138/135 |
| 2004/0221907 A1* | 11/2004 | Glejbøl et al. | 138/129 |
| 2006/0191311 A1 | 8/2006 | Fraser et al. | |
| 2009/0308478 A1* | 12/2009 | Vo | 138/109 |
| 2010/0154916 A1* | 6/2010 | Jackson et al. | 138/137 |

OTHER PUBLICATIONS

Written Opinion issued in PCT/US2010/027803, mailed on Nov. 1, 2010, 3 pages.

Office Action Issued in Chinese Appication No. 201080011965.0, Dated: Nov. 1, 2012 (8 Pages with English Translation).

* cited by examiner

COMPOSITE FLEXIBLE PIPE AND METHOD OF MANUFACTURE

CROSS-REFERENCE TO RELATED APPLICATIONS

This application claims priority from application 61/161,353, filed on Mar. 18, 2009, in the United States.

BACKGROUND OF THE DISCLOSURE

1. Field of the Disclosure

The present disclosure relates to flexible pipe for conducting petroleum or other fluids subsea or on land and a method of forming the same.

2. Description of the Related Art

A composite flexible may be formed in part from composite tape stacks. Composite tape stacks may be formed from a plurality of thin tape strips. The composite tape stacks may then be helically wound onto a pipe structure. During the wrapping of the composite tapes to the pipe structure gaps may occur between adjacent wrappings of the tape. As a result, the gaps may reduce the pressure integrity of the tubular pipe structure by potentially allowing pressure to extrude or "blow through" the pipe structure.

Systems and methods have been developed to improve the alignment of adjacent composite tape stacks, but such improvements may benefit even more with a system that allows for gaps to occur between adjacent tape stacks, thereby allowing less than full or nearly full coverage of the surface area of the pipe structure.

SUMMARY OF THE CLAIMED SUBJECT MATTER

In one aspect, the present disclosure relates to a flexible pipe including a tubular pipe structure, a first composite tape member having a T-shaped cross section, and a second composite tape member having a T-shaped cross section, in which the first composite tape member is wrapped on the pipe structure in a first orientation and the second composite tape member is wrapped on the pipe structure in a second orientation.

In another aspect, the present disclosure relates to a method of forming a flexible pipe. The method includes forming a first tape with a T-shaped cross section, forming a second tape with a T-shaped cross section, wrapping the first tape on a pipe structure in a first orientation, and wrapping the second tape on the pipe structure in a second orientation.

BRIEF DESCRIPTION OF THE DRAWINGS

Features of the present disclosure will become more apparent from the following description in conjunction with the accompanying drawings.

DETAILED DESCRIPTION

A flexible pipe and a method of forming the same, according to embodiments of the present disclosure, will be explained hereinafter by referring to the accompanying drawings.

The present disclosure may comprise an improvement on the disclosures disclosed in U.S. Pat. No. 6,491,779, filed on Apr. 24, 2000, entitled "Method of Forming a Composite Tubular Assembly," U.S. Pat. No. 6,804,942, filed on Sep. 27, 2002, entitled "Composite Tubular Assembly and Method of Forming Same," and U.S. Pat. No. 7,254,933, filed on May 6, 2005, entitled "Anti-collapse System and Method of Manufacture," which are herein incorporated by reference in their entireties.

Figure 1:
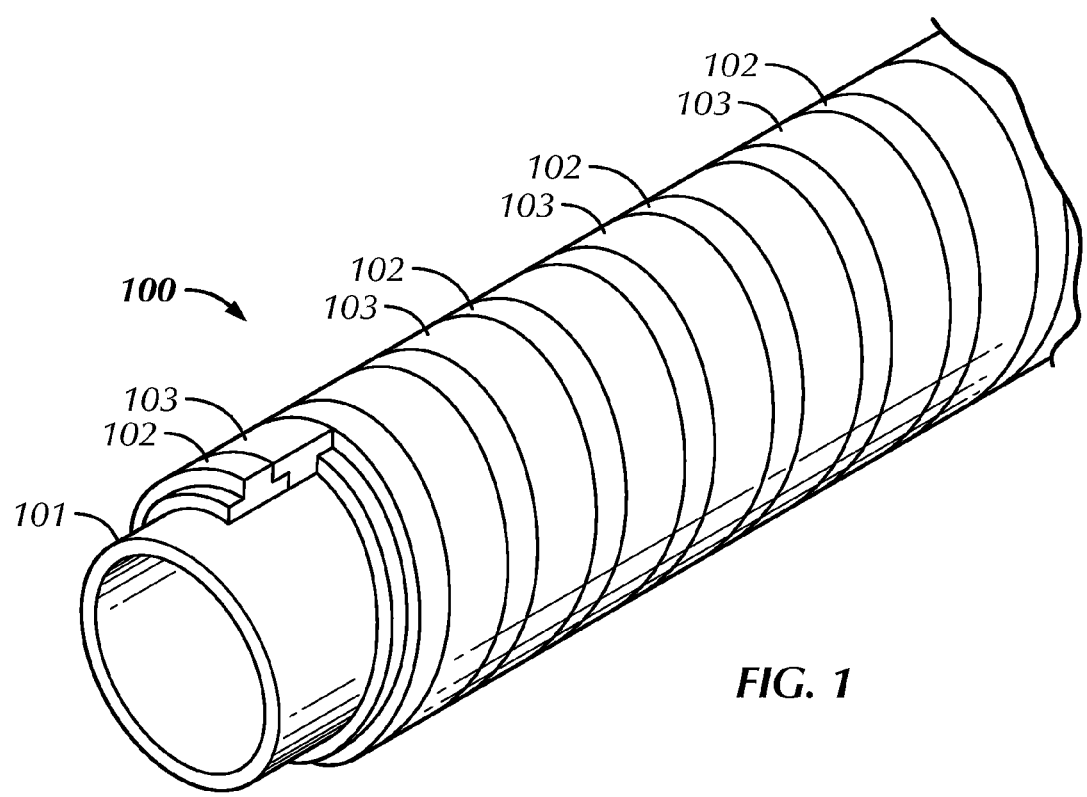
FIG. 1 is an isometric view of a flexible pipe in accordance with one or more embodiments of the present disclosure.

FIG. 1 is an isometric view of a flexible pipe in accordance with one or more embodiments of the present disclosure. A flexible reinforced pipe 100 may be formed by application of composite tape to the surface of a pipe structure, such as a liner or any other layer of a composite flexible pipe. As shown, a first composite tape 102 may be wrapped around a pipe structure 101. Further, a second composite tape 103 may also be wrapped around pipe structure 101. Tape 102 may represent a first orientation and tape 103 may represent a second orientation. Each tape 102 and 103 may have a T-shaped cross-section. The first orientation, tape 102, may form an inverted "T" with respect to the surface of pipe structure 101. The second orientation, tape 103, may form a regular "T" with respect to the surface of pipe structure 101. The composite tapes 102 and 103 may be formed from continuous wraps of tape. However, those skilled in the art will appreciate that the tapes 102 and 103 may be formed from applications of tape segments or sections, without deviating from the scope of the present invention.

Figure 2:
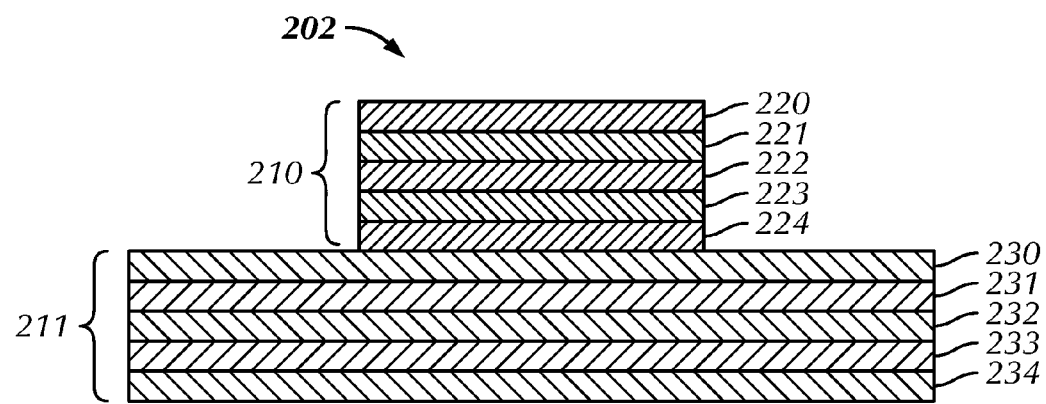
FIG. 2 is a blown-up cross-sectional view of a tape stack in accordance with one or more embodiments of the present disclosure.

A structure of a tape in accordance with one or more embodiments of the present disclosure will now be described with reference to FIG. 2. FIG. 2 shows a detailed cross-sectional view of a composite tape 202 that may be employed in one or more embodiments of the present disclosure. Composite tape 202 may be formed of two distinct regions, a narrow region 210 and a wide region 211. It may be preferred to have wide region 211 twice the width of narrow region 210, which may allow for overlap during application to the surface of a pipe structure, as described below. However, those skilled in the art will appreciate that other relationships in width between the two regions may be employed without deviating from the scope of the present disclosure.

As shown in FIG. 2, composite tape 202 may be formed in the shape of a "T" with the narrow region 210 and the wide region 211. Specifically, as shown, tape 202 is an inverted "T." Narrow region 210 may further include strips of tape 220, 221, 222, 223, and 224. Wide region 211 may further include strips of tape 230, 231, 232, 233, and 234. Accordingly, composite tape 202 may be formed of a number of strips of tape 220, 221, 222, 223, and 224 and 230, 231, 232, 233, and 234. Although narrow region 210 and wide region 211 may be formed of five strips of tape each, as shown in FIG. 2, those skilled in the art will appreciate that the tape may include more or less than ten strips of tape, without deviating from the scope of the present disclosure. Further, those skilled in the art will appreciate that narrow region 210 and wide region 211 may be of different thickness (i.e., including different numbers or thicknesses of tape strips), without deviating from the scope of the present disclosure.

Regions 210 and 211 may be constructed of multiple layers of individual tapes 220, 221, 222, 223, and 224 and 230, 231, 232, 233, and 234, respectively, which may be bound together with epoxy or other bonding material. Regions 210 and 211 may be constructed separately and then bonded together or may be formed as a single T-shaped structure. The T-shaped cross-section of composite tape 202 may be formed from a homogeneous material other than multiple layers of individual tapes. For example, homogeneous or reinforced polymers may be used to construct composite tape 202. Extruded materials, with or without supplemental reinforcements, may also be used to construct composite tape 202. Furthermore, regions 210 and 211 may have different structures and/or thicknesses such that more or less stiffness may be provided to each region 210 and 211.

Moreover, composite tape 202 may include a stack of laminated strips of material. Furthermore, although shown in FIG. 2 as having "straight" sides, the regions 210 and 211 may be tapered. Accordingly, the width of strips of tape 220, 221, 222, 223, and 224 and 230, 231, 232, 233, and 234 may each be different. For example, the width of strips of tape region 210 may increase or decrease as they are nearer to the surface of region 211. Or, conversely, the width of strips of tape region 211 may increase or decrease as they are nearer to the surface of region 210. Furthermore, both regions 210 and 211 may include tapered regions, or, one or the other of the regions may be tapered. Moreover, each individual layer of the regions 210 and 211 may allow for a stepped tapering, a smooth tapering (such as an inclined surface), or any other tapered method or surface, without deviating from the scope of the present disclosure.

Figure 3:
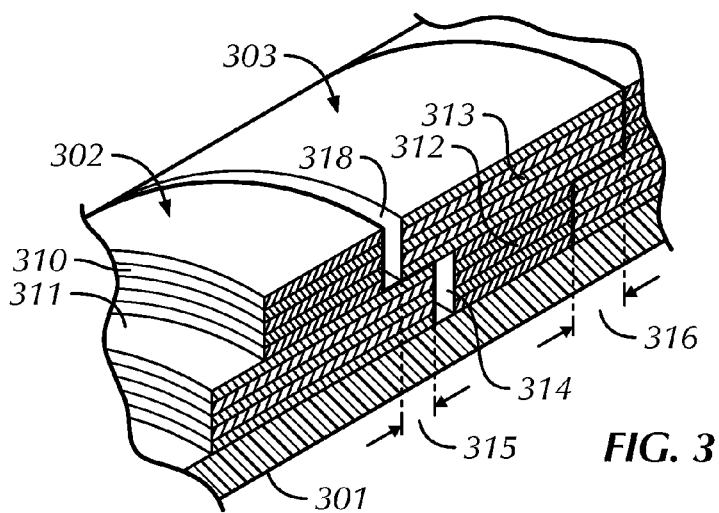
FIG. 3 is a cross-sectional view of tape stacks in accordance with one or more embodiments of the present disclosure.

Referring now to FIG. 3, a cross-sectional view of tape stacks in accordance with one or more embodiments of the present disclosure is shown. Composite tape 302, which may form an inverted "T" when applied to the surface of a pipe structure 301, may include a narrow region 310 and a wide region 311. Further, composite tape 303, which may form a regular "T" when applied to the surface of the pipe structure 301, may include a narrow region 312 and a wide region 313. As noted above, wide regions 311 and 313 may be twice as wide as narrow regions 310 and 312. Tape 302 may be wrapped onto pipe structure 301 in a conventional manner. Tape 303, which may be in an orientation opposite to that of tape 302, may then be wrapped onto pipe structure 301. Because the wide regions 311 and 313 of tapes 302 and 303, respectively, may extend beyond the narrow regions 312 and 310 of tapes 303 and 302, respectively, an overlap 315 or 316 may occur between tapes 302 and 303. As shown, with the wide regions 311 and 313 twice the width of the narrow regions 310 and 312, overlap 315 may be a partial overlap and overlap 316 may be a complete overlap. Because overlap 315 may be a partial overlap, gaps 314 and 318 may be included between adjacent regions of tapes 302 and 303.

Tapes 302 and 303 may be of similar cross-section and structure or the cross-sections and structures, including textiles, may vary, so long as overlap 315 may occur between adjacent wrappings of tapes 302 and 303. The primary difference between tapes 302 and 303 may only be the orientation of the narrow regions 310 and 312 and the wide regions 311 and 313, of tapes 302 and 303, respectively. Tape 302 may have wide region 311 in contact with the surface of pipe structure 301, whereas tape 303 may have narrow region 312 in contact with the surface of pipe structure 301.

Figure 4:
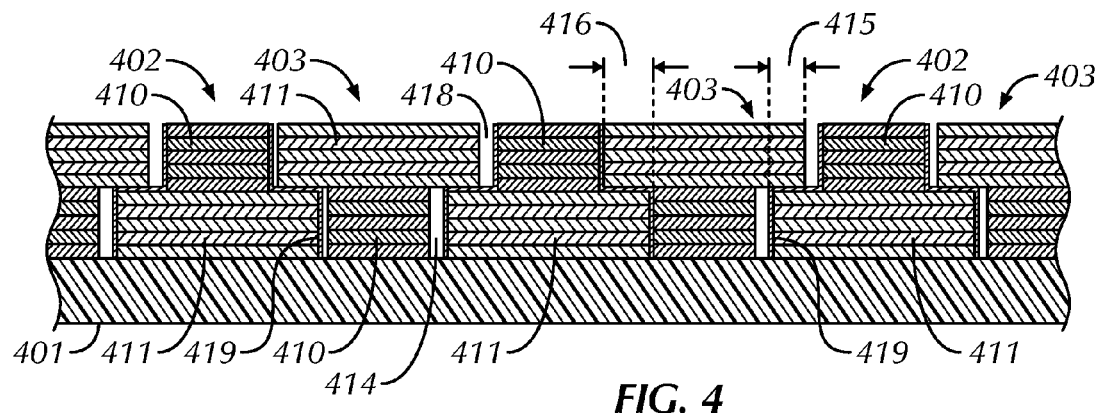
FIG. 4 is a partial-sectional view of a flexible pipe in accordance with one or more embodiments of the present disclosure showing various gaps between adjacent tapes.

As noted with respect to FIG. 3, gaps 314 and 318 may be included between adjacent wrappings of tapes 302 and 303. Now referring to FIGS. 4 and 5, the gap and overlap will be further described. During manufacturing of a flexible pipe in accordance with one or more embodiments of the present disclosure, gaps 414 and 418 may occur between adjacent wraps of tapes 402 and 403, as shown in FIG. 4. Gaps 414 may be partially bounded by a surface of pipe structure 401, and therefore may form an internal gap. Gaps 418 may form an external gap, and as shown, may be open to the exterior. During manufacture, gaps 414 and 418 may form because of the difficulty in precisely aligning tapes 402 and 403 when they are wrapped on pipe structure 401. The overlap 415 may close internal gaps 414 to prevent pipe structure 401 from extruding through an opening between wrappings of tape 402 and 403, as may occur if gaps 414 were not closed with overlap 415.

Gaps 414, for example, may occur during manufacturing that results in wide regions 411 and narrow regions 410 of tapes 402 and 403, respectively, covering less than 100% of the surface area of pipe structure 401. It is understood that without the present disclosure, as much as 100% coverage of the surface of a pipe structure may be needed to prevent extrusion of a pipe structure due to internal pressures within pipe structure. However, wide regions 411 and narrow regions 410 of tapes 402 and 403, respectively, may only need to cover approximately 80-90% of the surface area of pipe structure 401 to be able to resist extrusion of pipe structure 401 between gaps 414 and may allow the pipe to be bent without axially compressing T-shaped sections against adjacent vertical T-shaped section. In this case, axial is meant to be in a direction parallel to the pipe axis. This may result in an extrusion resistant pipe even when adjacent tapes 402 and 403 may not be lined up precisely next to one another during manufacture.

Figure 5:
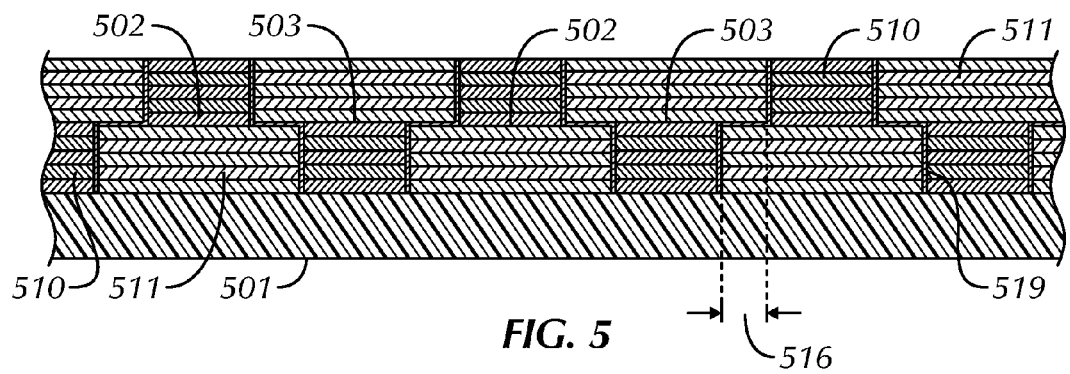
FIG. 5 is a partial-sectional view of a flexible pipe in accordance with one or more embodiments of the present disclosure showing no gaps between adjacent tapes.

FIG. 5 shows tapes 502 and 503 without gaps. Overlap 516 may be the only overlap present, thereby eliminating all gaps between adjacent wraps of tapes 502 and 503. As shown, each of the tapes 502 and 503 include narrow regions 510 and wide regions 511.

Referring again to FIGS. 4 and 5, when tapes 402 and 403, and, 502 and 503, respectively, may be applied to the surface of a pipe structure 401 or 501, a membrane layer 419 or 519 may be wrapped between adjacent wraps of tapes 402 and 403, and, 502 and 503, respectively. Membrane layer 419 or 519 may be wrapped after application of tape 402 or 502 and before application of tape 403 or 503. Membrane layer 419 or 519 may be a low-friction layer. The membrane layer may be made of polyethylene, nylon, or other similar flexible thermoplastic or elastomeric materials to provide low-friction contact between adjacent wraps of tape. Low-friction layer 419 or 519 may allow for relative movement between adjacent wraps of tape 402 and 403, and, 502 and 503.

Application in accordance with one or more embodiments of the present disclosure of the composite tape to a pipe structure will now be described with reference to FIG. 6. A typical arrangement for forming tapes 602 and 603, and wrapping them onto pipe structure 601, to form a flexible reinforced pipe 600, is shown schematically.

By way of example, tape strips 620, 621, 622, 623, and 624 and 630, 631, 632, 633, and 634 may be fed through a gathering die 640 to form tape 602. Gathering die 640 may include a die head 641 to form the tape structure, as desired, and in this case in an inverted "T" shape with respect to the surface of pipe structure 601. The tape strips may include laminates, reinforced tapes, or other known composites. Tape strips 620, 621, 622, 623, and 624 and 630, 631, 632, 633, and 634 may be bonded together with an epoxy or other bonding material. Tape strips 620, 621, 622, 623, and 624 may form a narrow region 610 of tape 602, and tape strips 630, 631, 632, 633, and 634 may form a wide region 611 of tape 602. The resulting tape 602 may be formed in gathering die 640 and may exit gathering die 640 through die head 641. After exiting die head 641, tape 602 may be wrapped on the surface of pipe structure 601.

Tape strips 625, 626, 627, 628, and 629 and 635, 636, 637, 638, and 639 may also be fed through a gathering die 642. Similar to gathering die 640, gathering die 642 may include a die head 643 to form the composite tape 603 in a desired configuration and orientation. Tape strips 625, 626, 627, 628, and 629 and 635, 636, 637, 638, and 639 may be bonded together with an epoxy or other bonding material. Tape strips 625, 626, 627, 628, and 629 may form a narrow region 612 of tape 602, and tape strips 635, 636, 637, 638, and 639 may form a wide region 613 of tape 602. The resulting tape 603 may be formed and may exit gathering die 642 through die head 643. Tape 603 may then be wrapped on the surface of pipe structure 601. Tape 603 may be wrapped onto the pipe structure 601 sufficiently close to tape 602 so that the wide region 611 of tape 602 may overlap the wide region 613 of tape 603.

Figure 6:
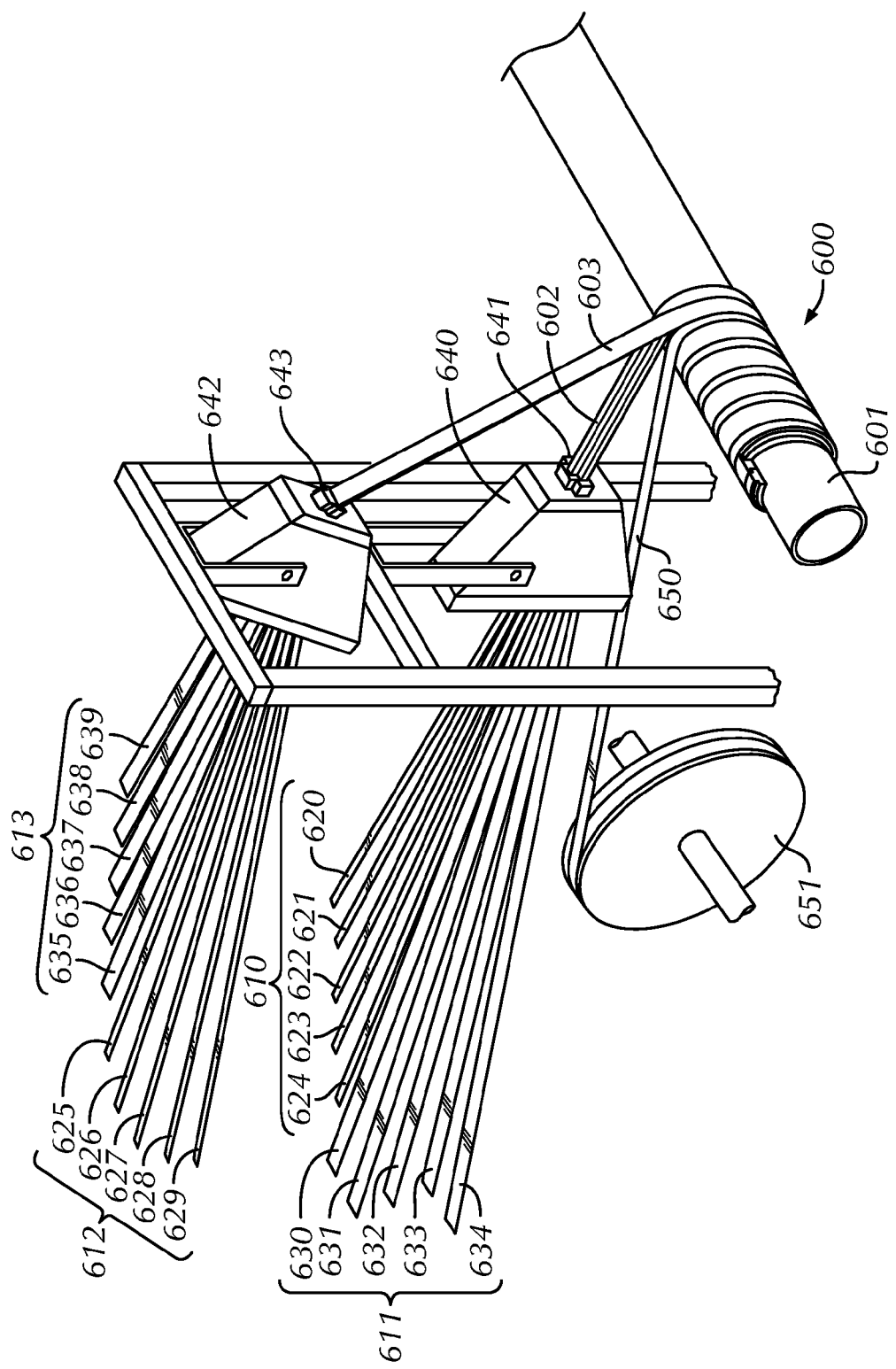
FIG. 6 is a schematic illustration of an apparatus to manufacture a flexible pipe in accordance with one or more embodiments of the present disclosure.

Also, as shown in FIG. 6, a low-friction tape 650 may be added between tapes 602 and 603 during manufacture. Low-friction tape 650 may be provided from a separate reel or feeder 651. Low-friction tape 650 may be made of polyethylene, nylon, or other similar flexible thermoplastic or elastomeric materials. Low-friction tape 650 may be optional and may be used when the combination of tapes 602 and 603 may be used to form a hoop strength layer outside of pipe structure 601. The hoop strength layer may provide resistance against expansion of pipe structure 601 due to internal pressure, or it may provide resistance against collapse or deformation of pipe structure 601 due to external pressure or external radial loading.

Alternative alignment devices (not shown) may also be used to position and wrap tapes 602 and 603 on pipe structure 601. In accordance with one or more embodiments of the present disclosure tapes 602 and 603 may be used singularly to wrap a pipe structure, such as a liner or other layer of a composite flexible pipe. Further, as noted above, tapes 602 and 603 may be used together to form an overlap between adjacent wraps. Tapes 602 and 603 may be applied in as many layers as desired. The tapes may be provided to prevent bursting of the pipe structure. The tapes may also, and/or alternatively, be used to prevent collapsing of the pipe structure from ambient pressure. Furthermore, additional layers may be applied to a pipe structure to provide axial strength to the flexible pipe to which they may be applied.

Figure 7:
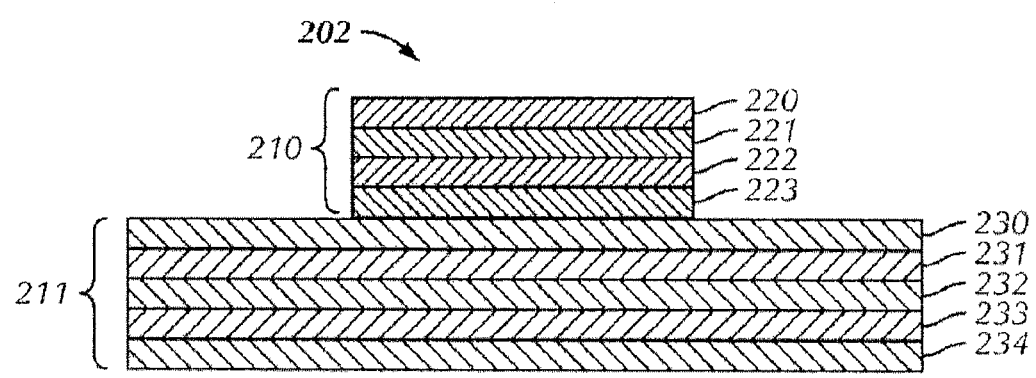
FIG. 7 is a blown-up cross-sectional view of a tape stack having a wide region and a narrow region, in which a thickness of the wide region is different from a thickness of the narrow region, in accordance with one or more embodiments of the present disclosure.

FIG. 7 is a blown-up cross-sectional view of a tape stack 202 having a wide region 211 and a narrow region 210, in which a thickness of the wide region 211 is different from a thickness of the narrow region 210, in accordance with one or more embodiments of the present disclosure. In other words, narrow region 210 and wide region 211 may be of different thickness (i.e., including different numbers or thicknesses of tape strips). For example, as shown, narrow region 210 may further include strips of tape 220, 221, 222, and 223, and wide region 211 may further include strips of tape 230, 231, 232, 233, and 234.

Figure 8:
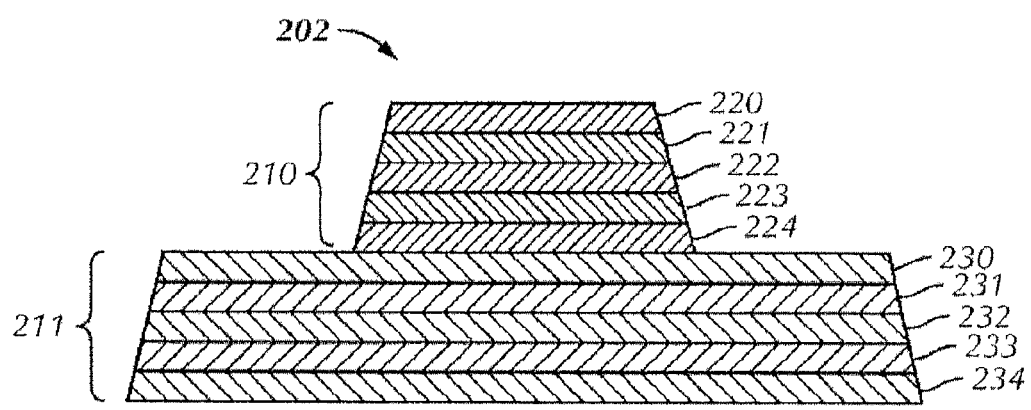
FIG. 8 is a blown-up cross-sectional view of a tape stack having a first composite tape member and a second composite tape member, in which each of the first composite tape member and the second composite tape member have at least one tapered surface parallel to a length direction of the tape, in accordance with one or more embodiments of the present disclosure.

FIG. 8 is a blown-up cross-sectional view of a tape stack 202 having a first composite tape member and a second composite tape member, in which each of the first composite tape member and the second composite tape member have at least one tapered surface parallel to a length direction of the tape, in accordance with one or more embodiments of the present disclosure. In other words, according to one or more embodiments, regions 210 and 211 may be tapered. As shown, regions 210 and 211 may be constructed of multiple layers of individual tapes 220, 221, 222, 223, and 224 and 230, 231, 232, 233, and 234, respectively, which may be bound together with epoxy or other bonding material. Accordingly, the width of strips of tape 220, 221, 222, 223, and 224 and 230, 231, 232, 233, and 234 may each be different. For example, the width of strips of tape region 210 may increase or decrease as they are nearer to the surface of region 211. Or, conversely, the width of strips of tape region 211 may increase or decrease as they are nearer to the surface of region 210. Furthermore, both regions 210 and 211 may include tapered regions, or, one or the other of the regions may be tapered. Moreover, each individual layer of the regions 210 and 211 may allow for a stepped tapering, a smooth tapering (such as an inclined surface), or any other tapered method or surface, without deviating from the scope of the present disclosure.

The tapes that may be in contact with the surface of the pipe structure may be wrapped in a non-binding relationship to the pipe structure. Subsequent or additional layers of tape may also be wrapped in a non-binding relationship to any existing layers. Such a non-binding arrangement may allow for each layer to slide relative to the pipe structure and, further, the tapes may slide relative to each other. Further, the tape layers may be in a non-interlocking relationship with each other.

Advantageously, one or more embodiments of the present disclosure may provide a flexible composite tape structure and method of making and using the tape structure to allow gaps to form between adjacent wrappings of the tape during manufacture while still providing pressure resistance to a pipe structure upon which the tape is wrapped.

Moreover, in accordance with one or more embodiments of the present disclosure, a tubular pipe structure may be wrapped with a first composite tape member having a T-shaped cross-section. At least one region of the first composite tape member may be wider (thicker in a width direction) than an opposing region. The two regions may be of similar structure, or may be constructed differently, such that differences in strength or stiffness may be provided. The wider region may be a continuous integral, connected region. The first composite tape member may be wrapped onto the pipe structure. A second composite tape member may also have a T-shaped cross section and at least one region that may be wider than another region of the second composite tape member. The second tape may then be wrapped on the pipe structure in an orientation that may be opposite to that of the first composite tape member, whereby, the wide region of the first composite tape member overlaps the wide region of the second composite tape member.

A method in accordance with one or more embodiments of the present disclosure may include forming a first composite tape having a T-shaped cross section that may be defined by at least one region that may be wider than an opposing region, forming a second composite tape that may also have a T-shaped cross section defined by at least one region that may be wider than an opposing region, wrapping the first composite tape on a pipe structure, and wrapping the second composite tape on the pipe structure in an orientation opposite to that of the first composite tape, whereby the wide regions of the first and the second composite tapes may overlap.

Advantageously, in accordance with one or more embodiments of the present disclosure, the overlapping wide regions of the first and second composite tapes may prevent any gaps from forming between adjacent wrappings of composite tape, which may prevent a pipe structure from extruding between adjacent wrappings of composite tape. Accordingly, the overlapping tapes may allow for coverage in the range of approximately 80-90% of the surface area of the pipe structure during application and manufacture while still resulting in a flexible pipe structure that may resist internal pressure and external pressure loads similar to bonded and unbonded flexible pipe structures which are known in the art. Therefore, the precision with which tape layers may be applied to the surface of a pipe structure during manufacture of a flexible pipe may be reduced. Furthermore, the cost of manufacture may be reduced and the efficiency of manufacture may be improved.

Although discussed herein as an application of a single layer including two adjacent and oppositely oriented T-tapes, additional layers of tapes may also be added as desired onto any existing layers. Moreover, in accordance with one or more embodiments of the present disclosure, composite tapes may be used in combination to serve as a hoop layer to contain internal pressure in a pipe structure or resist external pressure or radial loading. Further, in accordance with one or more embodiments of the present disclosure, tapes may also be used in combination as an additional or separate layer to form an anti-collapse layer where ambient pressure may be resisted to prevent collapse of the pipe.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A reinforced flexible pipe comprising:
a pipe structure;
a first composite tape member having a T-shaped cross section; and a second composite tape member having a T-shaped cross section,
wherein the first composite tape member is wrapped on the pipe structure in a first orientation and the second composite tape member is wrapped on the pipe structure in a second orientation, and
wherein the first composite tape member and the second composite tape member each comprise a plurality of laminated strips of material.

2. A reinforced pipe of claim 1, wherein the plurality of laminated strips of material are non-metallic and are bonded together.

3. The reinforced flexible pipe of claim 1, wherein the first orientation comprises an orientation of the first composite tape such that the T-shape is inverted with respect to an outer surface of the pipe structure.

4. The reinforced pipe of claim 1 further comprising a polymer layer disposed between the first and the second composite tape members.

5. The reinforced pipe of claim 4, wherein the polymer layer is low-friction so as to provide limited sliding movement between the first and the second composite tape members.

6. The reinforced pipe of claim 1, wherein a wide region of the T-shape of the composite tape members comprise a first region and a narrow region of the T-shape of the composite tape members comprise a second region.

7. The reinforced pipe of claim 6, wherein a thickness and textile structure of the first region is different from a thickness and textile structure of the narrow region.

8. The reinforced pipe of claim 6, wherein the first region of the first tape member overlaps with the first region of the second tape member.

9. The reinforced pipe of claim 1, wherein the tape members comprise reinforced extruded material.

10. The reinforced pipe according to claim 9, wherein the extruded material is selected from the group consisting essentially of: metal, polymer and glass.

11. The reinforced pipe according to claim 1, wherein at least one of the first composite tape member and the second composite tape member comprise at least one tapered surface parallel to a length direction of the tape.

12. A method of forming a flexible reinforced pipe, the method comprising:
forming a first tape with a T-shaped cross section; forming a second tape with a T-shaped cross section;
wrapping the first tape on a pipe structure in a first orientation;
wrapping the second tape on the pipe structure in a second orientation, and
wrapping a polymer layer on the first tape between the first tape and the second tape.

13. The method of claim 12, wherein the first orientation comprises an orientation of the first tape such that the T-shape is inverted with respect to an outer surface of the pipe structure.

14. The method of claim 12, wherein a wide part of the first tape overlaps with a wide part of the second tape.

15. The method of claim 12, wherein the polymer is a low-friction layer so as to provide limited sliding movement between the first and the second composite tape members.

16. The method of claim 12, wherein the first and the second tapes are formed by gathering a plurality of tape strips together in a gathering die.

17. The method of claim 16, wherein the gathering of the plurality of tape strips further comprises bonding the tape strips together.

18. The method of claim 12, wherein the first and second tapes comprise extruded material.

19. The method of claim 18, wherein the extruded material is reinforced.

* * * * *